United States Patent
Kaulbach et al.

(10) Patent No.: US 7,125,941 B2
(45) Date of Patent: Oct. 24, 2006

(54) AQUEOUS EMULSION POLYMERIZATION PROCESS FOR PRODUCING FLUOROPOLYMERS

(75) Inventors: Ralph Kaulbach, Emmerting (DE); Ludwig Mayer, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 124 days.

(21) Appl. No.: 10/468,134

(22) PCT Filed: Feb. 25, 2002

(86) PCT No.: PCT/US02/05800

§ 371 (c)(1),
(2), (4) Date: Aug. 15, 2003

(87) PCT Pub. No.: WO02/077046

PCT Pub. Date: Oct. 3, 2002

(65) Prior Publication Data

US 2004/0072977 A1    Apr. 15, 2004

(30) Foreign Application Priority Data

Mar. 26, 2001  (EP) .................................. 01201161

(51) Int. Cl.
*C08F 16/24* (2006.01)
(52) U.S. Cl. ...................... 526/247; 526/242; 526/249; 526/250; 524/805
(58) Field of Classification Search ................ 526/249, 526/242, 250, 247; 524/805
See application file for complete search history.

(56) References Cited

U.S. PATENT DOCUMENTS 3,311,566 A    3/1967    Hauptschein et al.

(Continued)

FOREIGN PATENT DOCUMENTS

EP    250767 A1 *    1/1988

(Continued)

OTHER PUBLICATIONS

P. Lovell, *Emulsion Polymerization and Emulsion Polymers*, John Wiley & Sons, Ltd., 1997, pp. 700-739.

*Primary Examiner*—David W. Wu
*Assistant Examiner*—Henry S. Hu
(74) *Attorney, Agent, or Firm*—Brian Szymanski

(57) ABSTRACT

The present invention provides a method of making a fluoropolymer through emulsion polymerization of one or more fluorinated monomers in an aqueous phase in the presence of a fluorinated surfactant. At least part of the fluorinated surfactant is added to the aqueous phase as an aqueous mixture with at least one organic liquid that is not miscible with water and that is selected from halogenated and non-halogenated organic liquids, the mixture having droplets having an average droplet diameter of not more than 1000 nm and the mixture being added to the aqueous phase in such an amount that the total amount of the fluorinated surfactant is not more than 1% by weight based on the weight of the aqueous phase and the total amount of said organic liquid is not more than 1% by weight based on the weight of said aqueous phase. The invention allows for an improvement of the efficiency of an aqueous emulsion polymerization process. In particular, the polymerization time can be reduced and the polymer yield may be improved.

18 Claims, 1 Drawing Sheet

U.S. PATENT DOCUMENTS

| | | | |
|---|---|---|---|
| 3,462,401 A * | 8/1969 | Syozo et al. | 526/206 |
| 3,635,926 A | 1/1972 | Gresham et al. | |
| 3,642,742 A | 2/1972 | Carlson | |
| 3,855,191 A | 12/1974 | Doughty, Jr. et al. | |
| 4,029,868 A * | 6/1977 | Carlson | 526/247 |
| 4,262,101 A | 4/1981 | Hartwimmer et al. | |
| 4,282,162 A | 8/1981 | Kuhls | |
| 4,439,385 A * | 3/1984 | Kuhls et al. | 264/37.18 |
| 4,552,925 A | 11/1985 | Nakagawa et al. | |
| 4,588,796 A | 5/1986 | Wheland | |
| 4,861,845 A | 8/1989 | Slocum et al. | |
| 4,864,006 A * | 9/1989 | Giannetti et al. | 526/209 |
| 5,219,910 A | 6/1993 | Stahl et al. | |
| 5,285,002 A | 2/1994 | Grootaert | |
| 5,312,935 A | 5/1994 | Mayer et al. | |
| 5,442,097 A | 8/1995 | Obermeier et al. | |
| 5,530,078 A | 6/1996 | Felix et al. | |
| 5,563,213 A | 10/1996 | Mayer | |
| 5,663,255 A | 9/1997 | Anolick et al. | |
| 5,895,799 A | 4/1999 | Wu et al. | |
| 5,955,556 A * | 9/1999 | McCarthy et al. | 526/249 |
| 5,973,091 A | 10/1999 | Schmiegel | |
| 5,990,330 A | 11/1999 | Sulzbach et al. | |
| 6,395,848 B1 * | 5/2002 | Morgan et al. | 526/214 |
| 6,436,244 B1 | 8/2002 | Führer et al. | |
| 6,518,442 B1 | 2/2003 | Felix et al. | |
| 6,613,941 B1 | 9/2003 | Felix et al. | |
| 6,642,307 B1 | 11/2003 | Sogabe et al. | |
| 6,825,250 B1 | 11/2004 | Epsch et al. | |

FOREIGN PATENT DOCUMENTS

| | | |
|---|---|---|
| EP | 0 617 058 A1 | 9/1994 |
| EP | 0 964 009 B1 | 12/1999 |
| EP | 0 969 027 A1 | 1/2000 |
| EP | 1 067 146 A1 | 1/2001 |
| JP | 46011031 | 12/1971 |
| WO | WO 2004/041878 A1 * | 5/2004 |

* cited by examiner

AQUEOUS EMULSION POLYMERIZATION PROCESS FOR PRODUCING FLUOROPOLYMERS

1. FIELD OF THE INVENTION

The present invention relates to an aqueous emulsion polymerization of fluorinated monomers to make fluoropolymers, i.e. polymers that have a partially or fully fluorinated backbone. In particular, the present invention relates to an improvement of the aqueous emulsion polymerization process by adding at least part of the fluorinated surfactant employed as a mixture with an organic liquid that is not miscible with water.

2. BACKGROUND OF THE INVENTION

Commonly known or commercially employed fluoropolymers include polytetrafluoroethylene (PTFE), copolymers of tetrafluoroethylene (TFE) and hexafluoropropylene (HFP) (FEP polymers), perfluoroalkoxy copolymers (PFA), ethylene-tetrafluoroethylene (ETFE) copolymers, terpolymers of tetrafluoroethylene, hexafluoropropylene and vinylidene fluoride (THV) and polyvinylidene fluoride polymers (PVDF). Commercially employed fluoropolymers also include fluoroelastomers and thermoplastic fluoropolymers. Fluoropolymers and their applications are further described in "Modern Fluoropolymers", edited by John Scheirs, John Wiley & Sons Ltd., 1997. The making of such fluoropolymers generally involves the polymerization of gaseous monomers, i.e. monomers that under ambient conditions of temperature and pressure are present as a gas. Several methods are known to produce the fluoropolymers. Such methods include suspension polymerization as disclosed in e.g. U.S. Pat. No. 3,855,191, U.S. Pat. No. 4,439,385 and EP 649863; aqueous emulsion polymerization as disclosed in e.g. U.S. Pat. No. 3,635,926 and U.S. Pat. No. 4,262,101; solution polymerization as disclosed in U.S. Pat. No. 3,642,742, U.S. Pat. No. 4,588,796 and U.S. Pat. No. 5,663,255; polymerization using supercritical $CO_2$ as disclosed in JP 46011031 and EP 964009 and polymerization in the gas phase as disclosed in U.S. Pat. No. 4,861,845.

Currently, the most commonly employed polymerization methods include suspension polymerization and especially aqueous emulsion polymerization. The aqueous emulsion polymerization involves the polymerization in the presence of a fluorinated surfactant, which is generally used to ensure the stabilization of the polymer particles formed. Accordingly, the emulsion polymerization process differs from suspension polymerization in which generally no surfactant is used which generally results in substantially larger polymer particles than in case of the aqueous emulsion polymerization.

In the aqueous emulsion polymerization, the polymerization speed, yield of polymer, comonomer incorporated, particle size and number are dependent on each other as well as on the emulsifier content. In order to optimize polymer yield, polymerization time and particle size, one can modify the pressure, temperature as well as the amount of fluorinated surfactant. For example, EP 612770 discloses the use of high amounts of fluorinated surfactant to increase the polymerization speed. However, increasing the amount of fluorinated surfactant has the disadvantage of increasing the cost and furthermore is environmentally undesirable.

U.S. Pat. No. 4,864,006 describes an aqueous emulsion polymerization process wherein an aqueous micro-emulsion of a perfluoropolyether is added to the polymerization reaction. The microemulsion in this US-patent is characterized as a monophase solution which is stable in the long run without providing "dispersion energy". It thus seems that the micro-emulsion discussed in this patent form upon simple mixing of the components without the need to apply "dispersion energy" through the use of special emulsifying equipment. Accordingly, this limits the type of surfactants that can be used and further may complicate the polymerization process. For example, as shown in the examples of this patent, the microemulsion of the perfluoropolyether is formed using a perfluoropolyether that has a carboxylic acid group as a surfactant. Such surfactants are expensive. Further, as shown in the examples of U.S. Pat. No. 4,864,006, the microemulsion forms at elevated temperatures which further complicates the process relative to one in which such a heating is not required and the surfactant can simply be added to the polymerization vessel at room temperature.

EP 969027 discloses a similar process as in U.S. Pat. No. 4,864,006 for making PTFE dispersions. Also in this patent application, a microemulsion of a perfluoropolyether obtained through emulsification with a perfluoropolyether surfactant is used to prepare the PTFE dispersion. Although small polymer particles are achieved in this process, it appears that large amounts of surfactant are used which is disadvantageous in that it makes the process more costly and puts an environmental burden on the process.

U.S. Pat. No. 5,895,799 discloses a microemulsion polymerization of TFE to produce very small particle dispersions of PTFE in water. Thus, in accordance with the teaching of this US patent, the polymerization of TFE proceeds in a microemulsion of liquid perfluorinated hydrocarbons. This microemulsion is formed by adding the perfluorinated hydrocarbon liquid and a fluorinated surfactant to water at a temperature and in proportions that result in a microemulsion. As is well known, microemulsions only form when the surfactant is used above its critical micelle concentration (CMC) (P. Lovell, "Emulsion Polymerization and Emulsion Polymers", J. Wiley, 1997, pages 700–739). As a result, the process taught in this US-patent will generally require large amounts of surfactant, typically much higher than the amounts employed in the conventional aqueous emulsion polymerization process which uses the surfactant in amounts below the CMC of the surfactant and therefore does not involve the use of a microemulsion during the polymerization process. The use of a microemulsion polymerization has the disadvantages already mentioned above and moreover may result in foam building during processing.

Because of the environmental burden that fluorinated surfactants may impose, it is generally desired to produce polymer dispersions that have substantially no fluorinated surfactant. Further, the presence of such fluorinated surfactants in the polymer product may be undesired in some applications of the fluoropolymers. Further, the fluorinated surfactants are generally expensive and it is therefore desired to minimize the amount necessary for the polymerization and/or to recover and recycle the fluorinated surfactants. Several methods are known to recover and recycle the fluorinated surfactants used in the aqueous emulsion polymerization. Such methods are disclosed in e.g. EP 524585, EP 566974, EP 632009, EP 731081, WO 99/62858, WO 99/62830 and DE 19932771. It will be appreciated by one skilled in the art that these recovery processes will be more efficient and less costly if the amount of fluorinated surfactant employed in the polymerization is minimized. For example, the amount of waste water produced in these recycling and recovery processes will generally be less if less fluorinated surfactant is used in the polymerization.

It would now be desirable to improve the aqueous emulsion polymerization of fluorinated monomers to produce fluoropolymers whereby low amounts of fluorinated surfactant can be employed, for example not more than 1% by weight based on the weight of the aqueous phase of the aqueous emulsion polymerization. It is further desirable that the process can be practiced with commonly employed fluorinated surfactants that can be easily and effectively recovered and/or removed from the fluoropolymer dispersions produced. It is in particular desirable to reduce the polymerization time, improve the yield of polymer solids obtained and/or to obtain fluoropolymer dispersions having a small particle size.

3. SUMMARY OF THE INVENTION

According to the present invention, there is provided a method of making a fluoropolymer through emulsion polymerization of one or more fluorinated monomers in an aqueous phase in the presence of a fluorinated surfactant. At least part of the fluorinated surfactant is added to the aqueous phase as an aqueous mixture with at least one organic liquid that is not miscible with water and that is selected from halogenated and non-halogenated organic liquids, the aqueous mixture having droplets having an average droplet diameter of not more than 1000 nm, typically between 3 nm and 1000 nm, preferably between 10 nm and 500 nm, more preferably between 20 nm and 200 nm and the mixture being added to the aqueous phase in such an amount that the total amount of the fluorinated surfactant is not more than 1% by weight, typically between 0.01% and 1% by weight, preferably between 0.05% to 0.4% based on the weight of the aqueous phase and the total amount of said organic liquid is not more than 1% by weight based on the weight of said aqueous phase.

The process of the invention has the advantage that commonly employed fluorinated surfactants such as perfluorooctanoic acid and salts thereof and perfluorooctane sulfonic acid and salts thereof can be used as the fluorinated surfactant. Further, the process can be run with low amounts of surfactants and can yield high polymer solids and small polymer particle sizes showing high dispersion stability with reduced coagulum. Typically, the polymer particle sizes (average size as measured by dynamic light scattering) that can be achieved are between 50 nm and 250 nm, such as between 70 nm and 100 nm. Moreover, the polymerization tine can be reduced and the copolymerization of TFE with other monomers is improved such that the comonomers can be incorporated more effectively. Finally, the process of the invention has an improved flexibility in the selection of organic liquid and fluorinated surfactant that can be used and does not further complicate the polymerization process.

In a further aspect, the invention relates to a method of making a fluoropolymer through emulsion polymerization of one or more fluorinated monomers in an aqueous phase in the presence of a fluorinated surfactant having the formula:

Y—$R_f$-Z-M           (I)

wherein Y represents hydrogen, Cl or F; $R_f$ represents a linear or branched perfluorinated alkylene having 4 to 10 carbon atoms; Z represents $COO^-$ or $SO_3^-$ and M represents a monovalent cation such as an alkali metal ion or an ammonium ion.

In the method according to this particular aspect of the invention, at least part of the fluorinated surfactant is added to the aqueous phase as an aqueous mixture with at least one organic liquid that is not miscible with water and that is selected from halogenated and non-halogenated organic liquids, the aqueous mixture having droplets having an average droplet diameter of not more than 1000 nm, typically between 3 nm and 1000 nm, preferably between 10 nm and 500 nm, more preferably between 20 nm and 200 nm and the mixture being added to the aqueous phase in such an amount that the total amount of the fluorinated surfactant is not more than 1% by weight, typically between 0.01% and 1% by weight, preferably between 0.05% and 0.4% by weight based on the weight of the aqueous phase and the total amount of the organic liquid is not more than 1% by weight based on the weight of the aqueous phase.

In a still further aspect, the present invention relates to an aqueous mixture consisting of a fluorinated surfactant and an organic liquid that is not miscible with water, said mixture comprising droplets having an average diameter between 20 nm and 200 nm, said organic liquid being selected from perfluorinated or partially fluorinated aliphatic or aromatic organic liquids that optionally contain up to 2 oxygen, sulphur and/or nitrogen atoms and said fluorinated surfactant corresponding to the following general formula:

Y—$R_f$-Z-M wherein Y represents hydrogen, Cl or F; $R_f$ represents a linear or branched perfluorinated alkylene having 4 to 10 carbon atoms; Z represents $COO^-$ or $SO_3^-$ and M represents a monovalent cation such as for example an alkali metal ion or an ammonium ion.

By the term "liquid" or "fluid" in connection with the present invention are included compounds that are liquid at a temperature of 20° C. and a pressure of 1 atm as well as compounds that are liquid under the polymerization conditions.

By the term "not miscible with water" is meant that the organic liquid forms a separate phase absent the surfactant when mixed with water in the amounts the organic liquid is employed.

4. DETAILED DESCRIPTION OF THE INVENTION

Figure 1:
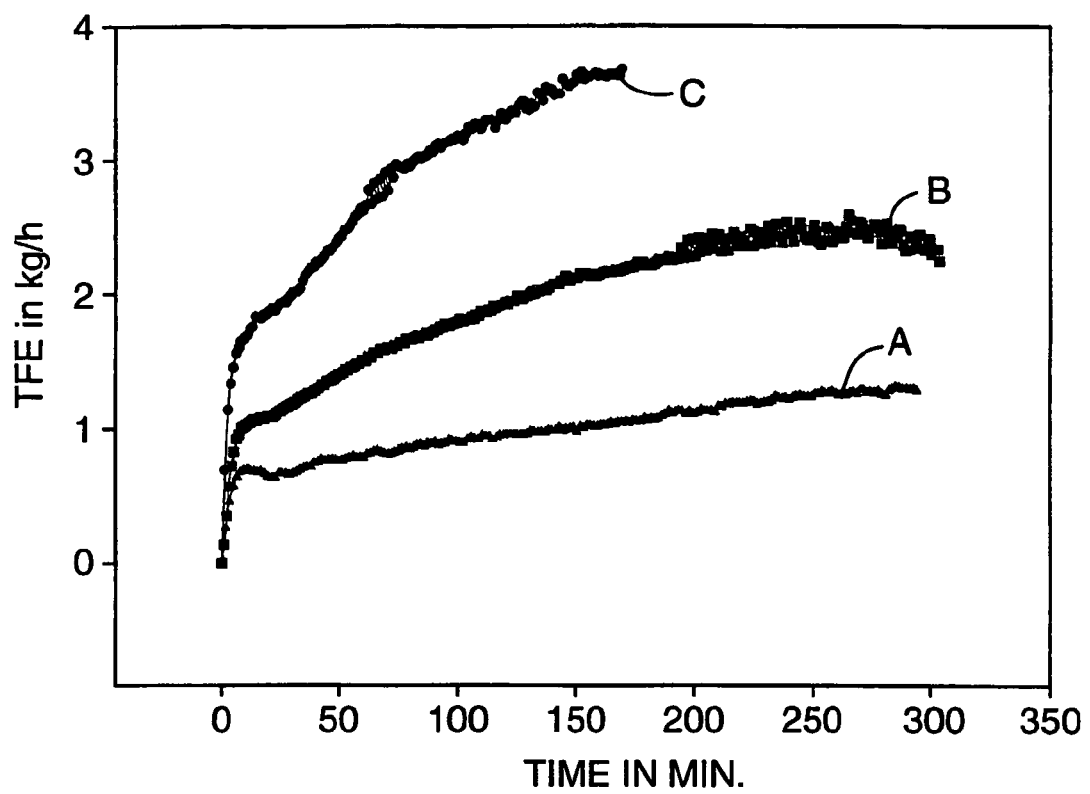
FIG. 1 is a plot depicting the progress of polymerization in Examples 2, 4 and Comparative Example 1.

The advantages of the process of the present invention are conveniently achieved by adding at least part of the fluorinated surfactant as an aqueous mixture with an organic liquid that is not miscible with water and which mixture has an average droplet diameter of not more than 1000 nm, to the aqueous phase. The organic liquid is generally selected from halogenated (e.g. fluorinated and/or chlorinated) and non-halogenated aliphatic and aromatic organic liquids that optionally have up to 2 oxygen, sulfur and/or nitrogen atoms. The organic liquid typically will have a boiling point of at least 50° C., preferably at least 100° C., more preferably at least 150° C. for example between 150° C. and 230° C. It has been found that the improvements achieved by the invention, for example the polymerization rate, are most pronounced when the organic liquid has a higher boiling point.

In a particular embodiment the organic liquid is capable of participating in the free radical polymerization reaction such that the organic liquid is being incorporated into the fluoropolymer structure produced. This has the advantage that little if any residual of the organic liquid will remain in the final polymer dispersion produced. Examples of organic liquids capable of participating in the polymerization include in particular liquid monomers such as halogenated or non-halogenated olefinic organic liquids, in particular liquid fluorinated monomers. Examples of liquid fluorinated monomers that can be used include liquid perfluorovinyl ethers such as perfluoro-2-propoxypropylvinyl ether, perfluoro-3-methoxy-n-propylvinyl ether and $CF_3$—$(CF_2)_2$—O—$CF(CF_3)$—$CF_2$—O—$CF(CF_3)$—$CF_2$—O—$CF$=$CF_2$ (PPVE-3).

Suitable organic liquids include non-halogenated aliphatic and aromatic hydrocarbons such as for example saturated and unsaturated cyclic, linear or branched aliphatic compounds, halogenated saturated and unsaturated cyclic, linear or branched aliphatic compounds including chlorinated and/or fluorinated saturated and unsaturated cyclic, linear or branched aliphatic compounds and halogenated aromatic compounds such as chlorinated or fluorinated aromatic compounds. Particularly preferred organic liquids are fluorinated aliphatic or aromatic compounds that optionally have up to 2 oxygen, nitrogen and/or sulfur atoms. The organic liquid may be perfluorinated or partially fluorinated, e.g. a fluorinated or perfluorinated hydrocarbon. By "perfluorinated" is meant that all hydrogen atoms attached to a carbon in the aliphatic or aromatic compound have been replaced by a fluorine atom.

Suitable perfluorinated hydrocarbons include perfluorinated saturated aliphatic compounds such as a perfluorinated alkane; a perfluorinated aromatic compound such as perfluorinated benzene, or perfluorinated tetradecahydro phenanthene. It can also be a perfluorinated alkyl amine such as a perfluorinated trialkyl amine. It can further be a perfluorinated cyclic aliphatic, such as decalin; and preferably a heterocyclic aliphatic compound containing oxygen or sulfur in the ring, such as perfluoro-2-butyl tetrahydrofuran.

Specific examples of perfluorinated hydrocarbons include perfluoro-2-butyltetrahydrofuran, perfluorodecalin, perfluoromethyldecalin, perfluoromethyldecalin, perfluoromethylcyclohexane, perfluoro(1,3-dimethylcyclohexane), perfluorodimethyldecahydronaphthalene, perfluorofluoorene, perfluoro(tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70 or FC 5312 all produced by 3M. The fluorinated alkanes can be linear or branched, with a carbon atom number between 3 and 20. Oxygen, nitrogen or sulfur atoms can be present in the molecules, but the number of such atoms per molecule should be 2 or less.

The amount of organic liquid in the aqueous phase of the emulsion polymerization should be not more than 1% by weight based on the aqueous phase. Generally, the amount of organic liquid will be not more than 0.5% by weight, preferably not more than 0.2% by weight, more preferably less than 0.1% by weight. Even amounts of not more than 0.01% by weight have been found to produce meritorious effects in the aqueous emulsion polymerization.

The fluorinated surfactant for use in the aqueous emulsion polymerization process can be any fluorinated surfactant known for use in aqueous emulsion polymerization of fluorinated monomers. Particularly preferred fluorinated surfactants include those according to the following formula:

$$Y-R_f-Z-M \qquad (I)$$

wherein Y represents hydrogen, Cl or F; $R_f$ represents a linear or branched perfluorinated alkylene having 4 to 10 carbon atoms; Z represents $COO^-$ or $SO_3^-$ and M represents a monovalent cation such as for example an alkali metal ion or an ammonium ion. Most preferred fluorinated surfactants for use in this invention are the ammonium salts of perfluorooctanoic acid and perfluorooctane sulphonic acid. Mixtures of fluorinated surfactants can be used.

In accordance with the process of the invention, at least part of the fluorinated surfactant used in the aqueous polymerization process is added to the aqueous phase in the form of an aqueous mixture with an organic liquid. The mixture may be prepared by mixing an aqueous solution of the fluorinated surfactant with the organic liquid. Typically, an aqueous solution containing between 0.01% by weight to 90% by weight, preferably 0.1 to 40% by weight of the fluorinated surfactant is mixed with 0.1 to 300% by weight, preferably 1 to 100% by weight based on the solids weight of the fluorinated surfactant, of the organic liquid or mixture of organic liquids. The organic liquid is mixed with the aqueous solution of the fluorinated surfactant and is emulsified therein such that droplets having an average droplet diameter of not more than 1000 nm, preferably 10 to 500 nm, more preferably between 20 and 200 nm are obtained. Such an emulsion can be obtained by any suitable emulsifying apparatus such as for example those from the company Microfluidics.

The mixture of the fluorinated surfactant and organic liquid may further be obtained by a predetermined contamination of the solid, liquid or molded fluorinated surfactant, in the acid, salt or ester form, with the organic liquid, for example in a recrystallization of the surfactant. Still further, a mixture of fluorinated surfactant and organic liquid can be prepared in the preparation of the fluorinated surfactant. For example, the corresponding acid of the fluorinated surfactants according to formula (I) may be distilled in the presence of the organic liquid, in particular perfluorinated or partially fluorinated aliphatic or aromatic organic liquids that optionally contain up to 2 oxygen, sulphur and/or nitrogen atoms, and subsequently converting the acid into its salt form, for example by adding ammonia if an ammonium salt is desired. The organic liquid may for example be added to the corresponding acid of the fluorinated surfactant and the mixture may then be distilled which will result in the distillate containing a mixture of acid and organic liquid.

The aqueous mixture of the fluorinated surfactant and organic liquid can then be obtained by emulsifying the contaminated fluorinated surfactant in water thereby achieving the desired number average droplet diameter of not more than 1000 nm, preferably between 10 and 500 nm, most preferably between 20 nm and 200 nm.

The aqueous mixture of fluorinated surfactant and organic liquid will generally contain between 20 and 40% by weight (based on total weight of the mixture) and between 0.1 to 70% by weight of the organic liquid. Preferably, the weight ratio of fluorinated surfactant to the organic liquid is between 1:2 and 50:1.

A thus prepared concentrated mixture of the fluorinated surfactant and organic liquid is added to the aqueous phase of the aqueous emulsion polymerization whereby the fluorinated surfactant concentration is reduced to achieve a fluorinated surfactant concentration in the aqueous phase of not more than 1% by weight, typically 0.01 to 1% by weight, preferably 0.05% to 0.4% based on the weight of the aqueous phase. Part or all of the fluorinated surfactant used in the aqueous emulsion polymerization may be added as a mixture with organic liquid. Generally at least 5% by weight, preferably at least 10% by weight of the total amount of fluorinated surfactant used will be added in the form of a mixture with the organic liquid. If only part of the fluorinated surfactant is added under the form of a mixture with organic liquid, the remainder of the fluorinated surfactant may be added separately to the aqueous phase. e.g. prior to the addition of the mixture of fluorinated surfactant and organic liquid. However, the total amount of fluorinated surfactant in the aqueous phase during the aqueous emulsion polymerization should not exceed 1% by weight based on the weight of the aqueous phase.

The type or nature of the mixture of organic liquid and fluorinated surfactant is not particularly critical except that the droplet sizes should not be more than 1000 nm as described above. The process of the present invention thus presents more flexibility and is more convenient to use. For example, the method of the present invention allows for the use of perfluoropolyethers such as disclosed in U.S. Pat. No. 4,864,006 as organic liquids without requiring that they be added in the form of a monophase solution that forms without providing "dispersion energy". Accordingly, the process of the invention allows for the use of any type of fluorinated surfactant to be used with perfluoropolyether organic liquids and moreover, the amounts necessary thereof are much less than is generally required in the prior art. Thus, it has been found that perfluoropolyethers such as described in U.S. Pat. No. 4,864,006 can be used with any fluorinated emulsifier, including any conventional emulsifier such as for example those according to the formula (I) above and in amounts of 0.01% by weight or even less, while still yielding the advantages of the process of this invention.

The mixture of fluorinated surfactant and organic liquid can be added at various points at the initial stage of the polymerization process. One skilled in the art can readily determine the appropriate point for the addition of the mixture of fluorinated surfactant and organic liquid. For example, the mixture of fluorinated surfactant and organic liquid can be added prior to the evacuation of air from the reaction vessel or after evacuation of air from the reaction vessel. The mixture may also be added after increasing the pressure in the reaction vessel with gaseous fluorinated monomers. The mixture of surfactant and organic liquid may for example be added prior to commencement of the polymerization, i.e. generally before the initiator is added to the polymerization. Alternatively, the mixture can be added simultaneously or even shortly (for example until about 2 minutes) after addition of initiator to the reaction vessel. Preferably, the mixture of fluorinated surfactant and organic liquid will be added to the reaction vessel over a short period of time, for example 5 to 10 minutes. It has been found that the improvements of the aqueous emulsion polymerization, in particular the polymerization time, are most pronounced when the period over which the mixture is added to the reaction vessel is held short.

Apart from the addition of at least part of the fluorinated surfactant as a mixture with organic liquid to the aqueous phase, the aqueous emulsion polymerization process is generally conducted in the commonly known manner. Preferred polymerization temperatures are 10 to 100° C., preferably 30° C. to 80° C. and a pressure of 4 to 30 bar, in particular 8 to 20 bar.

The aqueous emulsion polymerization process can be used to produce any of the known fluoropolymers, i.e. polymers that have a partially or fully fluorinated backbone. In particular, the aqueous emulsion polymerization process can be used to produce homo- and copolymers of gaseous fluorinated monomers such as tetrafluoroethylene, vinylidene fluoride and chlorotrifluoroethylene. Suitable comonomers include fluorinated monomers such as hexafluoropropene, perfluoro vinyl ethers including perfluoroalkyl vinyl ethers such as perfluoromethyl vinyl ether and perfluoro-n-propylvinyl ether and perfluoroalkoxy vinyl ethers such as those corresponding to the general formula:

wherein $R_f$ and $R'_f$ are different linear or branched perfluoroalkylene groups of 2–6 carbon atoms, m and n are independently 0–10 and the sum of n and m is at least 1, and $R''_f$ is a perfluoroalkyl group of 1–6 carbon atoms. Non-fluorinated monomers that can be used as comonomers include e.g. ethylene and propylene. The process of the invention can be used to produce polytetrafluoroethylene, fluoroelastomers as well as fluorothermoplasts.

The polymerization is generally initiated through the use of free radical generating initiators. As initiators, one can use any of the known initiators commonly employed in the polymerization of TFE. For example peroxides can be used as free radical initiators. Specific examples of peroxide initiators include, hydrogen peroxide, sodium or barium peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate, a combination of peroxodisulphate and hydrazine or azodicarboxamide (including salts thereof, preferably alkali or ammonium salts). Further initiators that can be used are ammonium- alkali- or earth alkali salts of permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization. Accelerators such as for example water soluble salts of iron, copper and silver may preferably be added, in particular when redox systems are used as initiators.

The aqueous emulsion polymerization system may further comprise other materials, such as buffers and, if desired, complex-formers or chain-transfer agents.

The achievable solids content of the polymer dispersion is typically from 5 to 40% without any major coagulum. The resultant dispersions are highly stable and generally have an number average particle diameter of not more than 250 nm, typically between 50 and 250 nm average particle sizes can be achieved.

EXAMPLES

The following examples further illustrate the invention without the intention however to limit the invention thereto. All parts and percentages are by weight unless indicated otherwise.

Abbreviations:
HFP: hexafluoropropylene
TFE: tetrafluoroethylene
ETFE: copolymer of ethylene and tetrafluoroethylene
VDF: vinylidene fluoride
FEP: copolymer of TFE and HFP
THV: copolymer of TFE, HFP and VDF
PFA: copolymer of TFE and perfluorovinyl ether
PPVE-1: perfluoro-n-propylvinyl ether
PPVE-2: perfluoro-2-propoxypropyl vinyl ether
MFI: melt flow index Test Methods The MFI gives the amount of a melt, in grams per 10 minutes, which is extruded through a die from a feed cylinder under the action of a piston loaded with weights. The dimensions of die, piston, feed cylinder, and weights are standardized (DIN 53735, ASTM D 1238). All of the MFIs mentioned here have been determined using a 2.1 mm die of length 8 mm, the weight applied being 5 kg and the temperature being 372° C.

Solids in the polymer dispersion obtained are determined by dry residue analysis using a thermal balance (Sartorius MA 40) and are given in percent by weight, based on the polymer dispersion.

Median droplet and particle diameter (dz) are determined using a device from the company Malvern (Autosizer 2C) by the photon correlation spectroscopy method to ISO 13321. This measuring device operates in the range from 3 to 3,000 nm with a He—Ne laser at a wavelength of 633 nm. The measurement temperature is 20±0.2° C.

The content of perfluorinated comonomers (U.S. Pat. No. 4,029,868, U.S. Pat. No. 4,552,925) is determined by IR spectroscopy, using a Nicolet Magna 560 FTIR.

Melting point is determined using a device from the company Perkin Elmer (Pyris 1) to ISO 3146 with a heating rate of 10° C. per minute. The data always refer to the second heating procedure.

The mixture of the emulsifier with the organic liquid is prepared in two stages. The organic liquid, such as the perfluorotrialkylamine FC 43 used from the company 3M and PPVE-2, are predispersed at the desired concentration in the aqueous emulsifier solution (FC 1015) for 1 minute using a Turrax stirrer (from the company IKA Labortechnik, model T 25 with 24,000 rpm). The median droplet sizes achieved here are from 900 to 1,300 nm. The resultant mixture is then passed 15 times through a device from the company Microfluidics (M-110Y), the mixture being pressed at 1,000 bar through a canula 75 μm in width. The resultant mixture has a median droplet diameter of from 65 to 120 nm, and is used for the polymerization. The median droplet diameters may be further reduced by raising the pressure, and via the number of passes.

Comparative Example 1

29 l of demineralized water are placed in a polymerization reactor with a total volume of 47 l, provided with an impeller stirrer. Once the reactor has been sealed, alternating evacuation and flushing with nitrogen are used to remove atmospheric oxygen and the vessel is heated to 70° C.

After an evacuation step, 240 g of ammonium perfluorooctanoate (FC 1015 from 3M) in the form of a 30% strength solution are metered into the vessel, within a period of 5 minutes. TFE and HFP are then introduced with stirring, in a ratio of 7:10, until the total pressure has reached 17.0 bar. This phase of introduction under pressure takes 1.5 hours. The polymerization is initiated by pumping in 24 g of ammonium peroxodisulphate (hereinafter APS), dissolved in 100 ml of demineralized water. As soon as the pressure begins to fall, more TFE and HFP are added via the gas phase in a feed ratio HFP/TFE of 0.11, so that the total pressure of 17.0 bar is maintained. The heat liberated is dissipated by cooling the vessel wall, and the temperature is thus held constant at 70° C. After 289 minutes the introduction of monomers is stopped, the pressure in the reactor reduced, and the reactor flushed several times with $N_2$. The resultant polymer dispersion has a total of 15.9% of solid, with a particle size of 173 nm. The resultant copolymer has an HFP content of 11.3%, a melting point of 263° C., and an MFI of 6.9.

Comparative Example 2

The polymerization is carried out as in Comparative Example 1, but here the FC 1015 used is modified using 3% by weight of FC 43 (from the company 3M) introduced and emulsified in the Turrax. The median droplet size in this mixture is 1200 nm. There was no improvement in the FEP polymerization. The running time was 300 minutes, producing 15.6% of solid and a median particle size of 172 nm. The composition and the resultant melting point are comparable to those of Example 1, with 11.2% of HFP and a melting point of 260° C.

Example 1

The polymerization is carried out as in Comparative Example 1, but the FC 1015 used is modified with 3% by weight of FC 43 (company 3M) introduced and emulsified in the Turrax and microfluidizer. The median particle size in this mixture is 110 nm. There is a marked improvement in the FEP polymerization. A running time of 317 minutes produces 23.2% of solid, with a median particle size of 141 nm. The HFP content shows a slight rise to 11.4%, and the resultant melting point shows a slight fall to 258° C.

Example 2

The polymerization is carried out as in Comparative Example 1, but the FC 1015 used is modified with 30% by weight of FC 43 (company 3M) introduced and emulsified in the Turrax and microfluidizer. The median particle size in this mixture is 120 nm. There is a dramatic improvement in the FEP polymerization. A running time of 169 minutes produces 23.2% of solid, with a median particle size of 70 nm. The running time is practically halved. The HFP content shows a substantial rise to 12.5%, and the resultant melting point shows a marked fall to 250° C.

Example 3

The polymerization is carried out as in Comparative Example 1, but the FC 1015 used is modified with 30% by weight of FC 43 (company 3M) introduced and emulsified in the Turrax and microfluidizer, and the feed time for this mixture is increased to 40 minutes prior to introduction of the monomers under pressure. The median particle size in this mixture is 120 nm. A running time of 273 minutes produces 23.1% of solid, with a median particle size of 135 nm. The effect of the metering time becomes noticeable here in that the metering time should be selected to be as short as possible to make the best possible use of the modification. The HFP content is 11.8%, and the resultant melting point is 256° C.

Comparative Example 3

The polymerization is carried out as in Comparative Example 1, but here four times the amount of FC 1015 is used. A running time of 245 minutes produces 23.8% of solid, with a median particle size of 103 nm. The HFP content is 12.7% and the resultant melting point is 247° C. Even with four times the amount of FC 1015, the FEP polymerization is still more than one hour slower than with the modified FC 1015 from Example 2.

Example 4

The polymerization is carried out as in Comparative Example 1, but here only 10% of the FC 1015 used are modified with 3% by weight (based on the entire amount of emulsifier used) of FC 43 (company 3M), introduced and emulsified in the Turrax and microfluidizer. The median droplet size in this mixture is 91 nm. This mixture is metered into the polymerization vessel after the monomers have been introduced under pressure, within a period of 5 minutes. The remaining 90% of the emulsifier, unmodified, form part of the initial charge in the polymerization vessel. There is a further marked improvement in the FEP polymerization. A running time of 305 minutes produces 27.6% of solid, with a median particle size of 108 nm. The HFP content is 12.5%, and the resultant melting point is 250° C.

Example 5

29 l of demineralized water are placed in a polymerization reactor with a total volume of 47 l, provided with an impeller stirrer. Once the reactor has been sealed, alternating evacuation and flushing with nitrogen are used to remove atmospheric oxygen and the vessel is heated to 70° C. After an evacuation step, 240 g of ammonium perfluorooctanoate (FC 1015 from 3M) in the form of a 30% strength solution, modified with an identical amount of FC 43 (namely 72 g), are metered into the vessel, within a period of 5 minutes. TFE and HFP are then introduced with stirring, in a ratio of 5:12, based on the partial pressure, until the total pressure has reached 17.0 bar. The polymerization is initiated by pumping in 24 g of ammonium peroxodisulphate (hereinafter APS), dissolved in 100 ml of demineralized water. As soon as the pressure begins to fall, more TFE and HFP are added via the gas phase in a feed ratio HFP/TFE of 0.18, so that the total pressure of 17.0 bar is maintained. The heat liberated is dissipated by cooling the vessel wall, and the temperature is thus held constant at 70° C. After 289 minutes the introduction of monomers is stopped, the pressure in the reactor reduced, and the reactor flushed several times with $N_2$. The resultant polymer dispersion has a total of 17.0% of solid, with a particle size of 73 nm. The resultant copolymer has an HFP content of 17.6%, and a melting point of 223° C.

Example 6

The polymerization is carried out as in Comparative Example 1, but here 10% of the FC 1015 used are modified with 10% by weight (based on the entire amount of emulsifier used) of PPVE-2, introduced and emulsified in the Turrax and microfluidizer. The median droplet size in this mixture is 68 nm. This mixture is metered into the polymerization vessel rapidly after the monomers have been introduced under pressure. The remaining 90% of the emulsifier, unmodified, form part of the initial charge in the polymerization vessel. There is a further marked improvement in the FEP polymerization. A running time of 300 minutes produces 20.5% of solid, with a median particle size of 145 nm. The HFP content is 11.9%, and the resultant melting point is 256° C.

Example 7

The polymerization is carried out as in Example 4, but here use is made of the perfluoro-2-butylfuran FC 75 with a boiling point of 102° C. instead of the FC 43 with a boiling point of 174° C. The median droplet size in this mixture is 89 nm. This mixture is metered into the polymerization vessel after the monomers have been introduced under pressure, within a period of 5 minutes. A running time of 302 minutes produces 16.2% of solid, with a median particle size of 162 nm. The HFP content is 11.3%, and the resultant melting point is 261° C.

Comparative Example 4

29 l of demineralized water are placed in a polymerization reactor with a total volume of 47 l, provided with an impeller stirrer. Once the reactor has been sealed, alternating evacuation and flushing with nitrogen are used to remove atmospheric oxygen and the vessel is heated to 63° C. After an evacuation step, 150 g of ammonium perfluorooctanoate in the form of a 30% strength solution are added to the vessel. 200 g of PPVE-1 are then pumped in. The stirring rate is set to 230 rpm. TFE is then introduced until a total pressure of 13.0 bar has been achieved. 19 g of methylene chloride are then added to the vessel. The polymerization is initiated by pumping in 2 g of ammonium peroxodisulphate, dissolved in 100 ml of demineralized water. As soon as the pressure begins to fall, more TFE and PPVE-1 are added via the gas phase in a feed ratio PPVE-1/TFE of 0.038, so that the total pressure of 13.0 bar is maintained. The heat liberated is dissipated by cooling the vessel wall, and the temperature is thus held constant at 63° C. A running time of 315 minutes produces 25.3% of solid, with a median particle size of 189 nm. The PPVE 1 content is 3.9%, and the resultant melting point is 308° C.

Example 8

The polymerization is carried out as in Comparative Example 4, but here 10% of the ammonium perfluorooctanoate used are modified with 10% by weight (based on the entire amount of emulsifier used) of FC 43 (company 3M), introduced and emulsified in the Turrax and microfluidizer. The median droplet size in this mixture is 68 nm. This mixture is metered into the polymerization vessel after the monomers have been introduced under pressure, within a period of 5 minutes. The remaining 90% of the emulsifier, unmodified, form part of the initial charge in the polymerization vessel. There is a marked improvement in the PFA polymerization.

A running time of 235 minutes produces 29.5% of solid, with a median particle size of 125 nm. The PPVE-1 content is 4.2%, and the resultant melting point is 306° C.

Comparative Example 5

29 l of demineralized water are placed in a polymerization reactor with a total volume of 47 l, provided with an impeller stirrer. Once the reactor has been sealed, alternating evacuation and flushing with nitrogen are used to remove atmospheric oxygen and the vessel is heated to 27° C. After an evacuation step, 240 g of ammonium perfluorooctanoate in the form of a 30% strength solution are added to the vessel. 38 g of diethyl malonate, 16 g of oxalic acid, and 56 g of ammonium oxalate are then pumped in. The stirrer rate is set to 230 rpm. TFE/HFP/ethylene are then introduced in a partial pressure ratio of 7:1:3 until the total pressure has reached 17.0 bar. The polymerization is initiated by pumping in 200 ml of 3% strength potassium permanganate solution. As soon as the pressure begins to fall, further TFE, HFP, and ethylene are added via the gas phase in a feed ratio HFP/TFE of 0.086, and an ethylene/TFE ratio of 0.272, so that the total pressure of 17.0 bar is maintained. The heat liberated is dissipated by cooling the vessel wall, and the temperature is thus held constant at 27° C. A running time of 410 minutes produces 22.4% of solid, with a median particle size of 205 nm. The product obtained has a melting point of 265° C.

Example 9

The polymerization is carried out as in Comparative Example 5, but here 10% of the ammonium perfluorooctanoate used are modified with 10% by weight (based on the total amount of the emulsifier used) of FC 43 (company 3M) introduced and emulsified in the Turrax and microfluidizer. The median droplet size in this mixture is 68 nm. This mixture is metered into the polymerization vessel once the monomers have been introduced under pressure. The remaining 90% of the emulsifier, unmodified, form part of the initial charge in the polymerization vessel. There is marked improvement in the ET polymerization. A running time of 330 minutes produces 22.8% of solid, with a median particle size of 165 nm.

Comparative Example 6

29 l of demineralized water are placed in a polymerization reactor with a total volume of 47 l, provided with an impeller stirrer. Once the reactor has been sealed, alternating evacuation and flushing with nitrogen are used to remove atmospheric oxygen and the vessel is heated to 43° C. After an evacuation step, 240 g of ammonium perfluorooctanoate in the form of a 30% strength solution are added to the vessel. 76 g of diethyl malonate, 13 g of oxalic acid, and 92 g of ammonium oxalate are then pumped in. The stirrer rate is set to 230 rpm. TFE/HFP/VDF are then introduced in a partial pressure ratio of 2.2:1:2 until the total pressure has reached 15.0 bar. The polymerization is initiated by pumping in 200 ml/h of 0.1% strength potassium permanganate solution. As soon as the pressure begins to fall, further TFE, HFP, and VDF are added via the gas phase in a feed ratio HFP/TFE of 0.47, and an VDF/TFE ratio of 0.86, so that the total pressure of 15.0 bar is maintained. The heat liberated is dissipated by cooling the vessel wall, and the temperature is thus held constant at 43° C. A running time of 321 minutes produces 33.2% of solid, with a median particle size of 129 nm. The product obtained has a melting point of 265° C.

Example 10

The polymerization is carried out as in Comparative Example 6, but here 10% of the ammonium perfluorooctanoate used are modified with 10% by weight (based on the total amount of the emulsifier used) of FC 43 (company 3M), introduced and emulsified in the Turrax and microfluidizer. The median droplet size in this mixture is 68 nm. This mixture is metered into the polymerization vessel after the monomers have been introduced under pressure, within a period of 5 minutes. The remaining 90% of the emulsifier, unmodified, form part of the initial charge in the polymerization vessel. There is a marked improvement in the THV polymerization. A running time of 265 minutes produces 34.1% of solid, with a median particle size of 81 nm.

Example 11

The polymerization is carried out as in Comparative Example 1, but 95% of the emulsifier, unmodified, forms an initial charge in the polymerization vessel, and only 5% of the FC 1015 used are modified with 1% by weight (based on the total amount of the emulsifier used, corresponding to 0.005% based on the polymerization medium) of perfluoropolyether (Hostinert 216), introduced and emulsified in the Turrax and microfluidizer. The median droplet size in this mixture is 68 nm. This mixture is metered into the polymerization vessel shortly after the addition of APS, within a period of 1 minute. There is a further marked improvement in the FEP polymerization. A running time of 300 minutes produces 25.5% of solid, with a median particle size of 108 nm.

The curves for the progress of polymerization in Examples 2, 4 and Comparative Example 1 are shown in FIG. 1. Curve A in FIG. 1 represents comparative example 1, curve B represents example 4 and curve C represents example 2.

The polymerization results from the examples are given in Table 1 below.

TABLE 1

| Example (E) Comparative Example (CE) | polymer | Solid [% by weight] | Running Time [min] | $d_{50}$ [nm] | MFI [372/5] | HFP or PPVE-1 [% by weight] | Melting point [° C.] |
|---|---|---|---|---|---|---|---|
| CE 1 | FEP | 15.9 | 289 | 173 | 6.8 | 11.3 | 263 |
| CE 2 | FEP | 15.6 | 300 | 172 | 6.9 | 11.2 | 260 |
| E 1 | FEP | 23.2 | 317 | 141 | 1.7 | 11.4 | 258 |

TABLE 1-continued

| Example (E) Comparative Example (CE) | polymer | Solid [% by weight] | Running Time [min] | $d_{50}$ [nm] | MFI [372/5] | HFP or PPVE-1 [% by weight] | Melting point [° C.] |
|---|---|---|---|---|---|---|---|
| E 2 | FEP | 23.2 | 169 | 70 | 0.5 | 12.5 | 250 |
| E 3 | FEP | 23.1 | 273 | 135 | 1.2 | 11.8 | 256 |
| CE 3 | FEP | 23.8 | 245 | 103 | 1.6 | 12.7 | 247 |
| E 4 | FEP | 27.6 | 305 | 108 | 0 | 12.5 | 250 |
| E 5 | FEP | 17.0 | 330 | 73 | 11.5 | 17.6 | 223 |
| E 6 | FEP | 20.5 | 300 | 145 | 3.2 | 11.6 | 256 |
| E 7 | FEP | 16.2 | 302 | 162 | — | 11.3 | 261 |
| CE 4 | PFA | 25.3 | 315 | 189 | 2.5 | 3.9 | 308 |
| E 8 | PFA | 27.5 | 235 | 125 | 1.6 | 4.2 | 306 |
| CE 5 | ETFE | 22.4 | 410 | 205 | — | — | — |
| E 9 | ETFE | 22.8 | 330 | 165 | — | — | — |
| CE 6 | THV | 33.2 | 321 | 129 | — | — | — |
| E 10 | THV | 34.1 | 265 | 81 | — | — | — |
| E 11 | FEP | 25.5 | 300 | 108 | — | — | — |

As can be appreciated from the above table and corresponding examples, the process of the invention can for the same polymerization time improve the solids yield of the polymerization process as well as reduce the size of the polymer particles. For example, as shown by comparison of comparative example 1 and example 4, the yield in the FEP polymerization is increased by about 30% while the particle size reduces by about 20%. Further, as can be seen from comparative example 2, this effect is not achieved if the droplet size of the added surfactant/organic liquid mixture exceeds 1000 nm.

A comparison of example 2 with comparative example 1 further shows that the process of the invention can reduce the polymerization time by 50% while increasing the solids yield by 30% and reducing the particle size by 60%. Such an improvement could not even be achieved by increasing the amount of surfactant by a factor 4 (comparative example 3).

The invention claimed is:

1. Method of making a fluoropolymer through emulsion polymerization of one or more fluorinated monomers in an aqueous phase in the presence of a fluorinated surfactant comprising adding at least part of said fluorinated surfactant to the aqueous phase as an aqueous mixture with at least one organic liquid that is not miscible with water and that is selected from halogenated and non-halogenated organic liquids, said aqueous mixture having droplets having an average droplet diameter of not more than 1000 nm and said aqueous mixture being added to the aqueous phase in such an amount that the total amount of said fluorinated surfactant is not more than 1% by weight based on the weight of the aqueous phase and the total amount of said organic liquid is not more than 1% by weight based on the weight of said aqueous phase, wherein the organic liquid is a perfluorinated or partially fluorinated aliphatic or aromatic organic liquid that contains up to a total of 2 oxygen, sulphur and/or nitrogen atoms per molecule.

2. Method according to claim 1 wherein said organic liquid is capable of participating in the polymerization of said one or more fluorinated monomers such that said organic liquid is built into the structure of said fluoropolymer.

3. Method according to claim 2, wherein said organic liquid is a halogenated olefinic organic liquid.

4. Method according to claim 1 wherein said organic liquid has a boiling point of at least 100° C.

5. Method according to claim 1 wherein the total combined amount of fluorinated surfactant and organic liquid is less than 1% by weight based on the weight of the aqueous phase.

6. Method according to claim 1 wherein the amount of organic liquid is not more than 0.2% by weight based on the weight of the aqueous phase.

7. Method according to claim 1 wherein said fluorinated surfactant corresponds to the following general formula:

Y—$R_f$-Z-M wherein Y represents hydrogen, Cl or F; $R_f$ represents a linear or branched perfluorinated alkylene having 4 to 10 carbon atoms; Z represents $COO^-$ or $SO_3^-$ and M represents a monovalent cation.

8. Method according to claim 6 wherein said fluorinated surfactant is an ammonium or metal salt of perfluoro octanoic acid or perfluoro octane sulphonic acid.

9. Method according to claim 1 wherein said fluorinated monomer comprises a gaseous fluorinated olefinic monomer.

10. Method according to claim 1 wherein said fluorinated monomer comprises tetrafluoroethylene, chlorotrifluoroethylene, hexafluoropropylene, vinylidene fluoride and/or perfluoro vinyl ether.

11. Method according to claim 1 wherein said mixture of said fluorinated surfactant with said organic liquid is added to the aqueous phase prior to the start of the polymerization and wherein the mixture is added at such a rate of addition that the mixture is added to the aqueous phase in not more than 10 minutes.

12. Method according to claim 1 wherein said mixture of said fluorinated surfactant with said organic liquid is added to the aqueous phase simultaneously with the addition of an initiator or until 2 minutes after the addition of initiator.

13. Method according to claim 1 wherein at least 10% by weight of said fluorinated surfactant is added as a mixture with said organic liquid to the aqueous phase.

14. Method according to claim 1 wherein all of said fluorinated surfactant is added as a mixture with said organic liquid to the aqueous phase.

15. Method according to claim 1 wherein the amount of said organic liquid in said mixture of said fluorinated surfactant with said organic liquid is between 0.1 and 300% by weight relative to the solids amount of said fluorinated surfactant in said mixture.

16. Method of making a fluoropolymer through emulsion polymerization of one or more fluorinated monomers in an aqueous phase comprising adding to the aqueous phase a fluorinated surfactant having the formula:

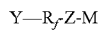

wherein Y represents hydrogen, Cl or F; $R_f$ represents a linear or branched perfluorinated alkylene having 4 to 10 carbon atoms; Z represents $COO^-$ or $SO_3^-$ and M represents a monovalent cation;

characterized in that at least part of said fluorinated surfactant is added to the aqueous phase as an aqueous mixture with at least one organic liquid that is not miscible with water and that is a perfluorinated or partially fluorinated aliphatic or aromatic organic liquid that contains up to a total of 12 oxygen, sulphur and/or nitrogen atoms per molecule, said aqueous mixture having droplets having an average droplet diameter of not more than 1000 nm and said mixture being added to the aqueous phase in such an amount that the total amount of said fluorinated surfactant is not more than 1% by weight unused on the weight of the aqueous phase and the total amount of said organic liquid is not more than 1% by weight based on the weight of said aqueous phase.

17. Method according to claim 16 wherein the amount of organic liquid is less than 0.2% by weight based on the weight of the aqueous phase.

18. Method according to claim 16 wherein said organic liquid is not more than 0.01% by weight based on the weight of the aqueous phase.

* * * * *

UNITED STATES PATENT AND TRADEMARK OFFICE
CERTIFICATE OF CORRECTION

PATENT NO. : 7,125,941 B2 Page 1 of 1
APPLICATION NO. : 10/468134
DATED : October 24, 2006
INVENTOR(S) : Ralph Kaulbach It is certified that error appears in the above-identified patent and that said Letters Patent is hereby corrected as shown below:

On Title Page page 2 item 56

Column 2
U.S. Patent Documents, Line 10, delete "B1" following "6,825,250" and insert -- B2 -- in place thereof.

Column 3
Line 47, delete "tine" and insert -- time -- in place thereof.

Column 18
Line 5, Claim 16, delete "unused" and insert -- based -- in place thereof.

Signed and Sealed this

Ninth Day of January, 2007

JON W. DUDAS
*Director of the United States Patent and Trademark Office*